United States Patent

Toyama et al.

[11] Patent Number: 5,941,128
[45] Date of Patent: Aug. 24, 1999

[54] MACHINE TOOL HAVING PARALLEL STRUCTURE

[75] Inventors: Taizo Toyama, Kariya; Motoshi Suzuki, Nagoya, both of Japan

[73] Assignee: Toyoda Kokoi Kabushiki Kaisha, Kariya, Japan

[21] Appl. No.: 08/950,438

[22] Filed: Oct. 15, 1997

[30] Foreign Application Priority Data

Oct. 21, 1996 [JP] Japan ................................. 8-278332

[51] Int. Cl.⁶ .............................. B25J 17/02; F16B 7/10
[52] U.S. Cl. ..................... 74/490.06; 901/29; 409/211; 403/53
[58] Field of Search ........................ 74/490.03, 490.06; 901/23, 28, 29; 403/53, 57, 58; 464/160, 182; 409/201, 211, 216, 235

[56] References Cited

U.S. PATENT DOCUMENTS

| | | | |
|---|---|---|---|
| 4,819,496 | 4/1989 | Shelef | 74/490.03 |
| 4,988,244 | 1/1991 | Sheldon et al. | 409/201 X |
| 5,053,687 | 10/1991 | Merlet . | |
| 5,259,710 | 11/1993 | Charles . | |
| 5,575,597 | 11/1996 | Bailey et al. . | |
| 5,601,377 | 2/1997 | Ohya | 403/58 |
| 5,715,729 | 2/1998 | Toyama et al. | 74/490.03 |

FOREIGN PATENT DOCUMENTS 2 144 711   3/1985   United Kingdom .

OTHER PUBLICATIONS

Taizo Toyama, et al., Toyoda Koki Technical Review, vol. 37, No. 2, (serial No. 134), pp. 50–55, "Parallel Link Cutting Machine", Oct. 1996.

M. Uchiyama, et al., Proceedings of the 9th Annual Conference of the Robotics Society of Japan, No. 1, pp. 65–66, "Singularity Analysis of a Parallel Robot Hexa", 1991.

Primary Examiner—John A. Jeffery
Assistant Examiner—Brandon C. Stallman
Attorney, Agent, or Firm—Oblon, Spivak, McClelland, Maier & Neustadt, P.C.

[57] ABSTRACT

A machine tool includes a base, a traveling plate to which a tool is to be attached, plural rods, and plural drive mechanisms fixed to the base. Each of the drive mechanisms is provided with a slide table movable on the drive mechanism and with an actuator for moving the slide table. One end of each of the rods is swingably connected to the corresponding slide tables through a first joint and the other end of each of the rods is swingably connected to the traveling plate through a second joint. Each of the first and the second joints include two rolling elements, each of which is rotatably supported by a rolling bearing to swing the rod.

As the rolling elements are supported by the rolling bearings without a clearance, the positioning accuracy of the machine tool is enhanced.

10 Claims, 6 Drawing Sheets

MACHINE TOOL HAVING PARALLEL STRUCTURE

BACKGROUND OF THE INVENTION

1. Field of the Invention

The present invention relates to a machine tool in which plural rods are arranged between a base and a traveling plate in a parallel way. More particularly, the present invention relates to a rod of the machine tool.

2. Description of the Prior Art

Figure 1:
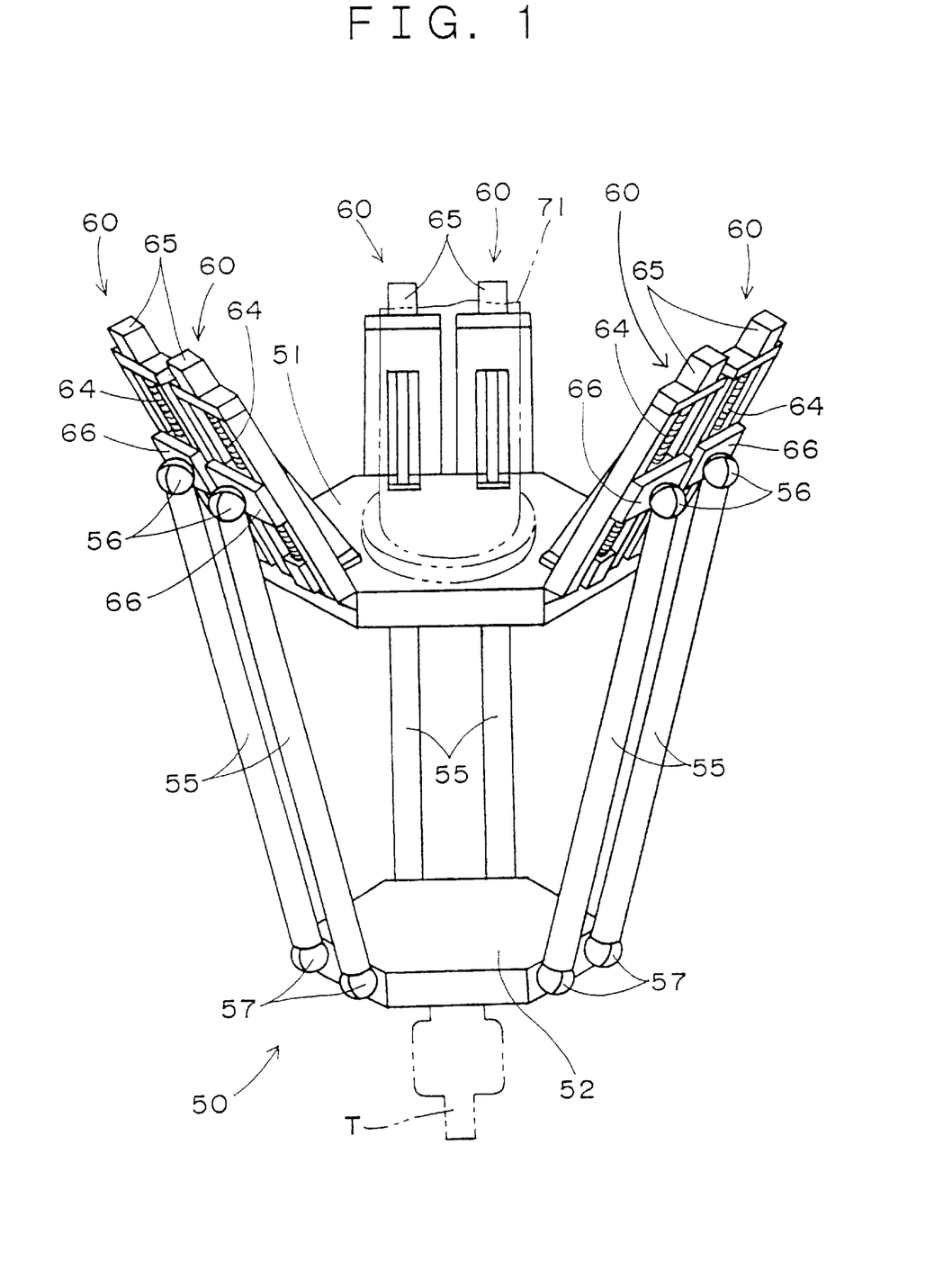
FIG. 1 is a perspective view of a conventional machine tool having a parallel structure.

A Machine tool having a parallel structure have been proposed. An example of the machine tool is shown in U.S. Pat. No. 5,715,729. As shown in FIG. 1, the machine tool 50 is mainly composed of a base 51, a traveling plate 52, six drive mechanisms 60 and six rods 55. The base 51 is fixed to an outside fixed portion through a support column 71 shown by chain double-dashed lines. To the traveling plate 52 a tool T, e.g., a drill or an end mill, is attached. Each of the drive mechanisms 60 includes a motor 65 to move a slide table 66 through a ball screw 64. One end of the rod 55 is connected to the corresponding slide table 66 through a joint 56. The other end of the rod 55 is connected to the traveling plate 52 through a joint 57.

In the configuration described above, when the motor 65 of the six drive mechanisms 60 are respectively activated in response to command signals from an unillustrated controller, the six slide tables 66 are respectively moved to swing the six rods 55 individually. The combination of the swing movements of the six rods 55 causes that the traveling plate 52 is controlled in the six-degree-of-freedom, that is position and attitude control.

In the above configuration, each of the rods 55 has five-degree-of-freedom with two kinds of the joints 56 and 57. One has two-degree-of-freedom and the other has three-degree-of-freedom. A ball joint or a universal joint are in use for the joints 56 and 57. The reason of that is to avoid the appearance of the singular positions of overmobility in the parallel structure. An example paper showing the singular positions of overmobility is Singularity Analysis of a Parallel Robot HEXA in Proceedings of the 9th Annual Conference of the Robotics Society of Japan, 1991 (on Pages 65 and 66).

However, the traveling plate 52 does not have high positioning accuracy because of a clearance between a pair of elements constituting the ball joint or the universal joint for the joints 56 and 57. This drawback cause deterioration of positioning accuracy and rigidity of the machine tool 50 with the parallel structure. Since the ball joint and the universal joint acts with the friction between pair of elements of the ball joint or the universal joint, the friction decreases durability of the machine tool 50. In addition, as the range of movement of the ball joint or the universal joint with three-degree-of-freedom is relatively narrow because of its complicated structure, the range of movement of the machine tool 50 is decreased.

SUMMARY OF THE INVENTION

Accordingly, an object of the present invention is to provide an improved machine tool with a parallel structure having high positioning accuracy.

Another object of the present invention is to provide an improved machine tool with a parallel structure whose range of movement is widened.

Briefly, a machine tool includes a base, a traveling plate to which a tool is to be attached, plural rods, and plural drive mechanisms fixed to the base. Each of the drive mechanisms is provided with a slide table movable on the drive mechanism and with an actuator for moving the slide table. One end of each of the rods is swingably connected to the corresponding slide tables through a first joint and the other end of each of the rods is swingably connected to the traveling plate through a second joint. The first joint includes a first rolling element rotatably supported to the slide table through a rolling bearing and a second rolling element rotatably supported to the first rolling element through a rolling bearing, and the second rolling element is connected to the rod. The second joint includes a third rolling element rotatably supported to the traveling plate through a rolling bearing and a fourth rolling element rotatably supported to the third rolling element through a rolling bearing, and the fourth rolling element is connected to the rod.

In the machine tool having the above mentioned construction, each of the first and the second joints includes two rotating elements for the two-degree-of-freedom. As the rolling elements are supported by the rolling bearings without a clearance, the positioning accuracy of the machine tool is enhanced. The configuration with the rolling bearings causes decreasing wear of the rolling elements, enhancing durability of the of the machine tool.

In one preferable aspect of the invention, the rod has the third joint between the first and the second joints. This configuration provides the rod including the first joint with the two-degree-of-freedom, the third joint with the one-degree-of-freedom, and the second joint with the two-degree-of-freedom in this order, without any joints with the three-degree-of-freedom as the ball joint or the universal joint in the prior art. This simple configuration of the rod widens the range of movement of the traveling plate in the machine tool with the parallel structure compared with one in the prior machine tool having the rod including a joint with the three-degree-of-freedom.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Referring now to FIGS. 2 to 5, one embodiment of the present invention is described hereinafter.

Figure 2:
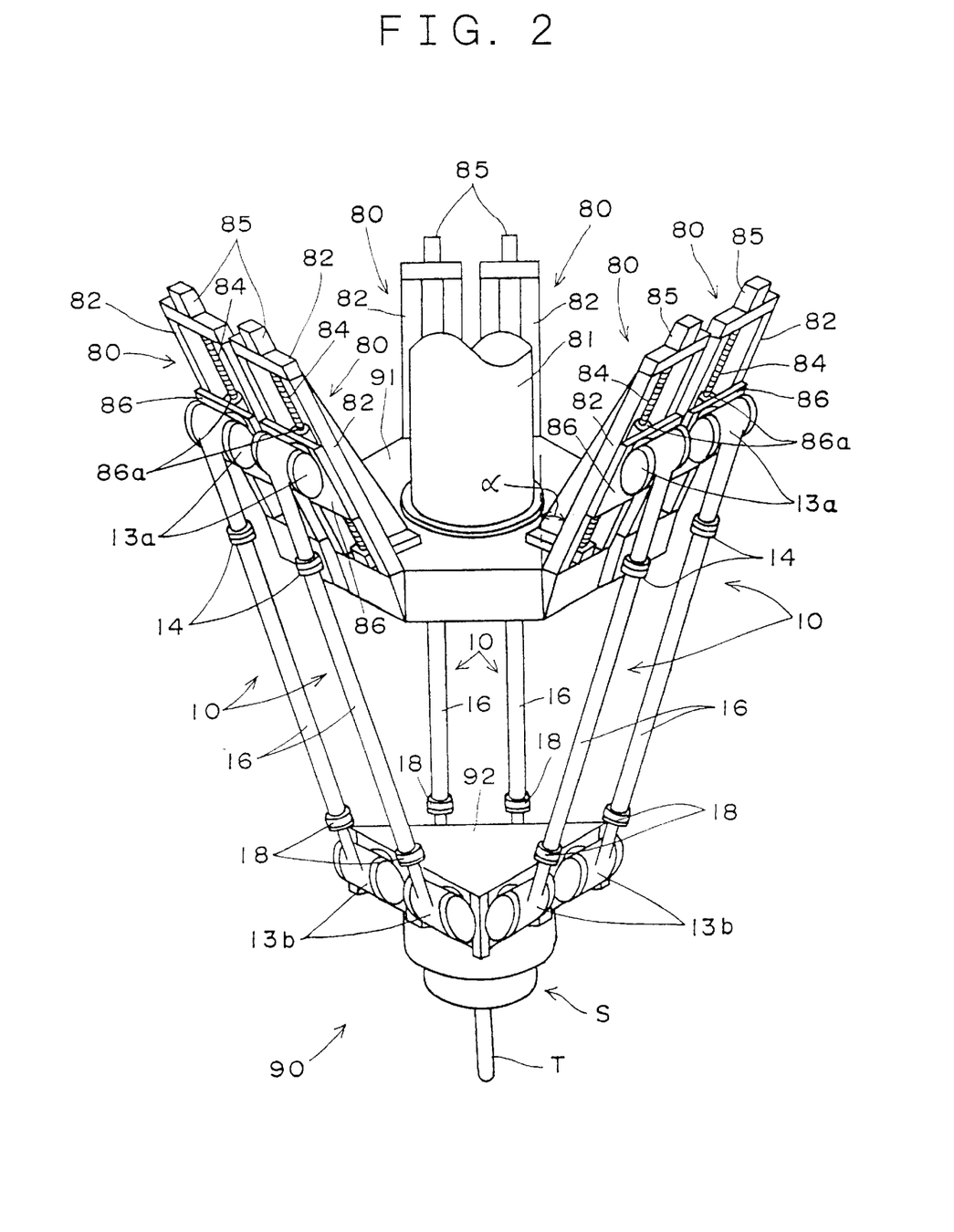
FIG. 2 is a perspective view of a machine tool having a parallel structure according to the present invention.

FIG. 2 is a perspective view of a machine tool 90 having a parallel structure according to the embodiment of the present invention. The machine tool 90 is mainly composed of a base 91, a traveling plate 92, six drive mechanisms 80 and six rods 10. The base 91 is fixed to an outside fixed portion through a support column 81. To the traveling plate 92 a tool T, e.g., a drill or an end mill, is attached. Each of the drive mechanisms 80 is designed to move each of the rods 10. The rods connect between the base 91 and the traveling plate 92 through the drive mechanisms 80.

These components of the machine tool 90 are described in more detail hereinafter. The base 91 is a hexagonal shape, and the six drive mechanisms 80 are arranged on alternate three sides of the base 91 in pairs at equal space intervals.

Each of the drive mechanism 80 includes a guide base 82, a ball screw 84, a motor 85 (i.e., an actuator) and a slide table 86. A pair of the guide bases 82 diagonally outwardly stands on the base 91 with a predetermined angle α (e.g., an angle of 45 degrees). The guide base 82 is formed with a groove into approximately a U-letter shape in its cross-section. The ball screw 84 extends in the longitudinal direction of the guide base 82 which supports both ends of the ball screw 84 in the groove, rotatably. The motor 85 is coupled with one end of the ball screw 84 to rotate the ball screw 84. The slide table 86 includes a nut 86a engaging with the ball screw 84. The slide table 86 is connected to a first joint 1 3a of the rod 10 described hereinafter. With this configuration, when the motor 85 is activated to rotate the ball screw 84, the slide table 86 is moved in the longitudinal direction of the guide base 82.

The traveling plate 92 is a triangular shape, and six second joints 13b of the rod 10 described hereinafter are arranged at three sides of the traveling plate 92 in pairs. The traveling plate 92 is detachably provided with a main spindle S having the tool T on the back of the traveling plate 92.

Figure 3:
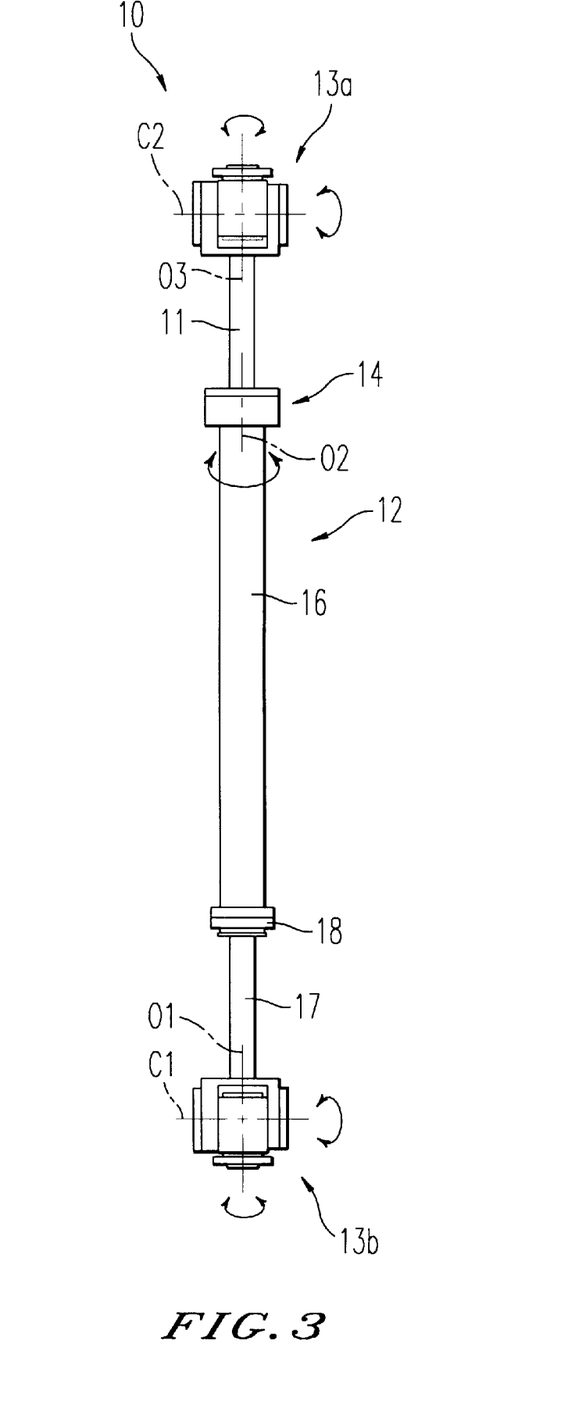
FIG. 3 is an enlarged view of a rod of FIG. 2.

As shown in FIG. 3, the rod 10 consists of the first joint 13a, a first rod portion 11, a third joint 14, a second rod portion 12 and the second joint 13b in this order. The first joint 13 is designed to have two rotating axes of an axis O3 and an axis C2, that is two-degree-of-freedom. The second joint 13b is designed to have two rotating axes of an axis O1 and an axis C1, that is two-degree-of-freedom. The third joint 14 is designed to have one rotating axis of an axis O2, that is one-degree-of-freedom. The three axes O1, O2 and O3 correspond to the center axis of the rod 10. The axes C1 and C2 are perpendicular to the center axis of the rod 10. Therefore, the rod 10 is designed to have five-degree-of-freedom.

One end of the first rod portion 11 is connected to the first joint 13a. The other end is connected to one end of the second rod portion 12 through the third joint 14, so as that the first rod portion 11 and the second rod portion 12 are respectively rotatable each other. The second rod portion 12 consists of a middle rod portion 16, a flange 18 and a connecting rod portion 17. One end of the middle rod portion 16 is connected to the end of the first rod portion 11 through the third joint 14. The other end of the middle rod portion 16 is connected to one end of the connecting rod portion 17 through the flange 18, so as that the middle rod portion 16 and the connecting rod portion 17 are in one body. The other end of the connecting rod portion 17 is connecting to the second joint 13b.

Figure 4:
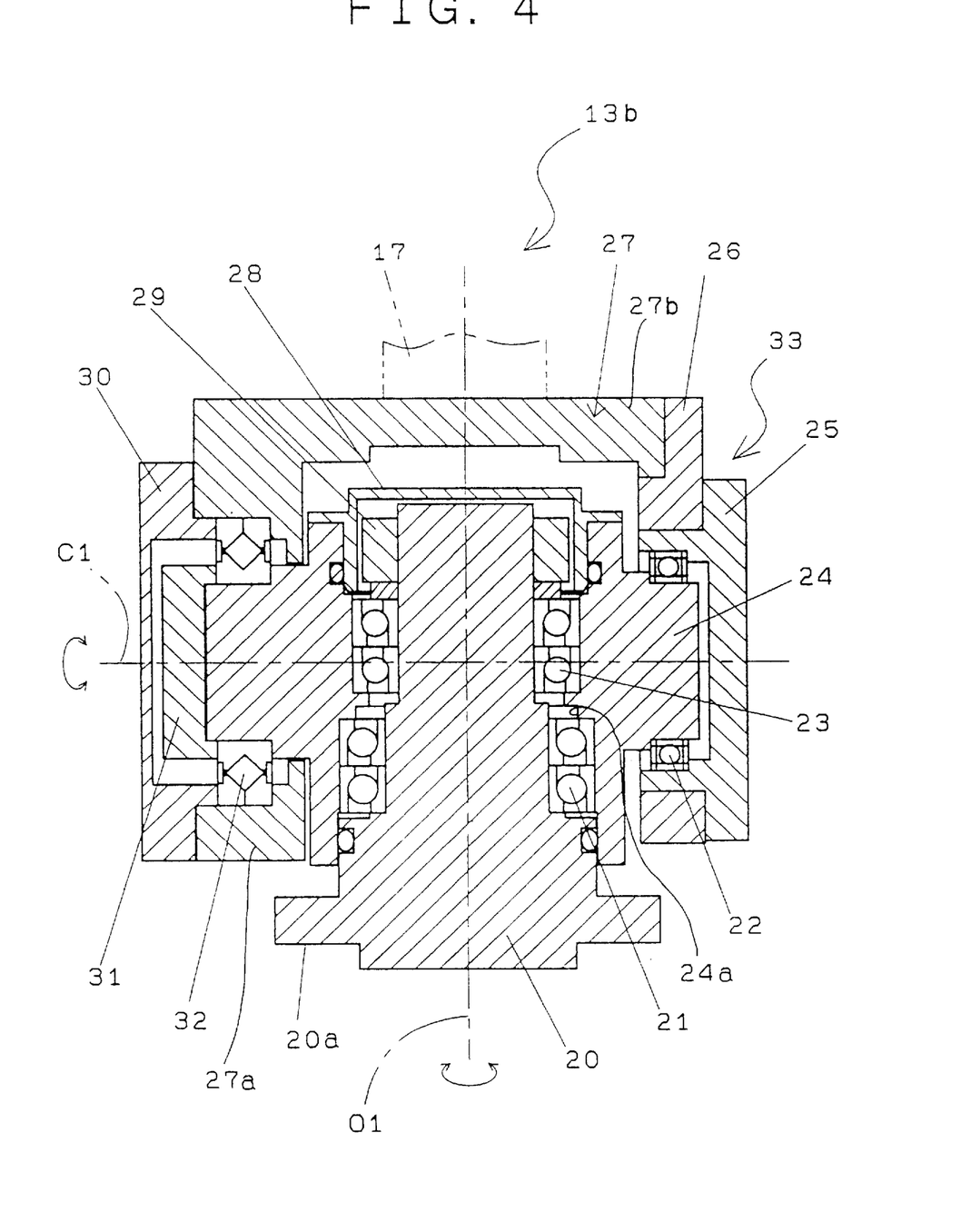
FIG. 4 is an enlarged view of a second joint of FIG. 2.

Referring to FIG. 4, the second joint 13b is only described hereinafter because the first joint 13a and the second joint 13b include the same elements in their configurations. The second joint 13a mainly consists of a shaft 20, rolling bearings 21 and 23, a first rolling element 24, rolling bearings 22 and 32, and a second rolling element 33.

The shaft 20 is approximately a cylindrical shape in the direction of the axis O1. The shaft 20 forms a shaft flange 20a at one end of the shaft 20 to be fixed on the traveling plate 92 with unillustrated nuts. The rolling bearings 21 are located on an outer surface of a large diameter portion of the shaft 20. The rolling bearings 23 are located on an outer surface of a small diameter portion of the shaft 20. A type of the rolling bearings 21 and 23 is an angular contact ball bearing. A lock nut 29 is fastened on the other end of the shaft 20 to fix the rolling bearings 21 and 23 on the shaft 20 with pre-load. The lock nut 29 is covered with a cover 28 seated one end of the first rolling element 24 for dust-proof for the rolling bearings 21 and 23.

The first rolling element 24 is approximately a cylindrical shape in the direction of the axis C1. The first rolling element 24 includes a through hole 24a at the center of the side face thereof to receive the shaft 20 through the rolling bearings 21 and 23. Therefore, the first rolling element 24 is designed to rotate about the axis O1. The rolling bearing 22 is located on an outer surface of one end of the first rolling element 24. The rolling bearing 32 is located on an outer surface of the other end of the first rolling element 24. A type of the rolling bearing 22 is a radial ball bearing, and one of the rolling bearing 32 is a crossed roller bearing. On the end of the first rolling element 24, e.g., at an outer side of the rolling bearing 32, a bearing support 31 is attached to fix the rolling bearing 32 on the first rolling element 24.

The second rolling element 33 is supported on the first rolling element 24 through the rolling bearings 22 and 32 located on both ends of the first rolling element 24. The second rolling element 33 is designed to rotate about the axis C1 perpendicular to the axis O1. The second rolling element 33 is approximately formed a reverse U-letter shape in its cross-section in FIG. 4. The second rolling element 33 includes a first side plate 25, a bracket 26, a frame 27 and a second side plate 30. The first side plate 25 is supported on an outer race of the rolling bearing 22 to rotate about the axis C1. The bracket 26 is fixed on the inner surface of the first side plate 25. The frame 27 has an L-letter shape to form a first frame portion 27a and a second frame portion 27b in FIG. 4. The first frame portion 27a parallel to the bracket 26 is supported on an outer race of the rolling bearing 32, so as that the frame 27 rotates about the axis C1. The second side plate 30 is attached on the outer surface of the first frame portion 27a of the frame 27 to fix the outer race of the rolling bearing 32 on the second rolling element 33. The second frame portion 27b is connected to the bracket 26. The connecting rod portion 17 of the second rod 16 is vertically fixed on the center of the second frame portion 27b. As described above, the second joint 13b has two-degree-of-freedom, rotations about the axes O1 and C1. The first joint 13a has two-degree-of-freedom in the same way, rotations about the axes O3 and C2.

Figure 5:
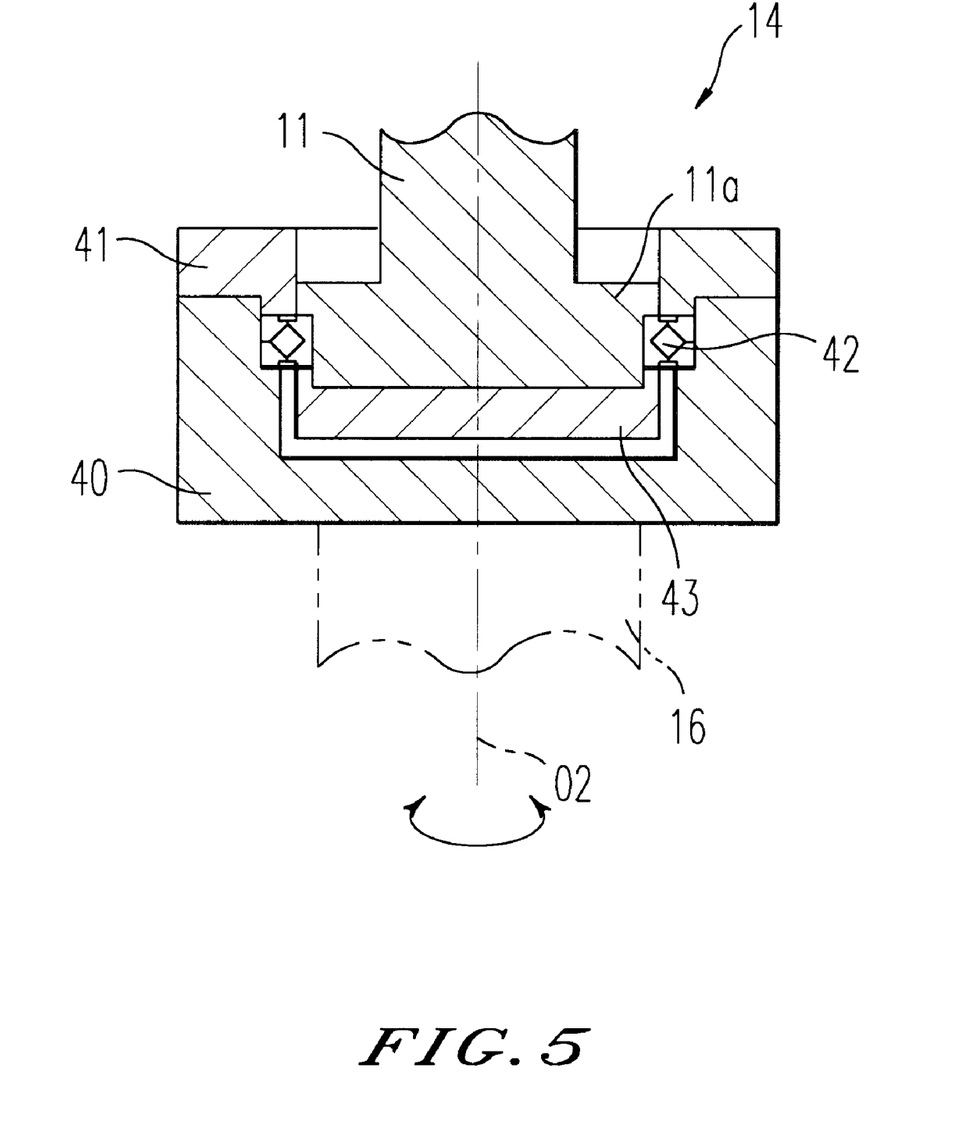
FIG. 5 is an enlarged view of a third joint of FIG. 2.

Referring to FIG. 5, the third joint 14 is described hereinafter. The third joint 14 consists of a shaft portion 11a, rolling bearing 42, a frame 40, a bearing support 43 and a cap 41. The shaft portion 11a is formed at the bottom end of the first rod portion 11. The diameter of the shaft portion 11a is larger than one of the first rod portion 11, and the center axis of the shaft portion 11a corresponds to the axis O2. The rolling bearing 42 is located on an outer surface of the shaft portion 11a. A type of the rolling bearing 42 is a crossed roller bearing. The frame 40 is supported on an outer race of the rolling bearing 42. The frame 40 is fixed on the top end of the middle rod portion 16, and the center axis of the frame 40 corresponds to the axis O2. The bearing support 43 is attached on the end of the shaft portion 11a to fix an inner race of the rolling bearing 42 between the bearing support 43 and the shaft portion 11a. The cap 41 is attached on the end of the frame 40 to fix the outer race of the rolling bearing 42 between the cap 41 and the frame 40. Therefore, the third joint 14 is designed to rotate the first rod portion 11 and the middle rod portion 16, respectively. As described above, the third joint 14 has one-degree-of-freedom, a rotation about the axis C2.

In the configuration of this embodiment described above, when the motors 85 of the six drive mechanisms 80 are respectively activated in response to command signals from an unillustrated controller, the six slide tables 86 are respectively moved in the longitudinal direction of the guide bases 82 to swing the six rods 10 individually. The combination of the swing movements of the six rods 10 causes that the traveling plate 92 is controlled in the six-degree-of-freedom, that is position and attitude control.

As described above, the five-degree-of-freedom of the rod 10 is composed of the five rotating elements with rolling bearings. Each of the first and the second joints 13a and 13b includes two rotating elements for the two-degree-of-freedom which are the first rotating element 24 with the rolling bearings 21 and 23, and the second rotating element 33 with the rolling bearings 22 and 32. The third joint 14 includes one rotating element for the one-degree-of-freedom which is the frame 40 as a rotating element with the rolling bearing 42. As the rolling elements are supported by the rolling bearings without a clearance, the positioning accuracy and the rigidity of the machine tool 90 are enhanced. The configuration with the rolling bearings causes decreasing wear of the rolling elements, enhancing durability of the of the machine tool 90.

The rod 10 of the machine tool 90 includes the first joint 13a with the two-degree-of-freedom, the third joint 14 with the one-degree-of-freedom, and the second joint 13b with the two-degree-of-freedom in this order, without any joints with the three-degree-of-freedom as a ball joint or a universal joint. This configuration of the rod 10 widens the range of movement of the traveling plate 92 in the machine tool 90 with the parallel structure compared with one in the prior machine tool having the rod including a joint with the three-degree-of-freedom.

In addition, the rod 10 is provided with two same joints, the first and the second joints 13a and 13b. Using the common joints 13a and 13b simplifies the construction of the rod 10, decreasing the manufacturing cost of the machine tool 90.

Second Embodiment

Figure 6:
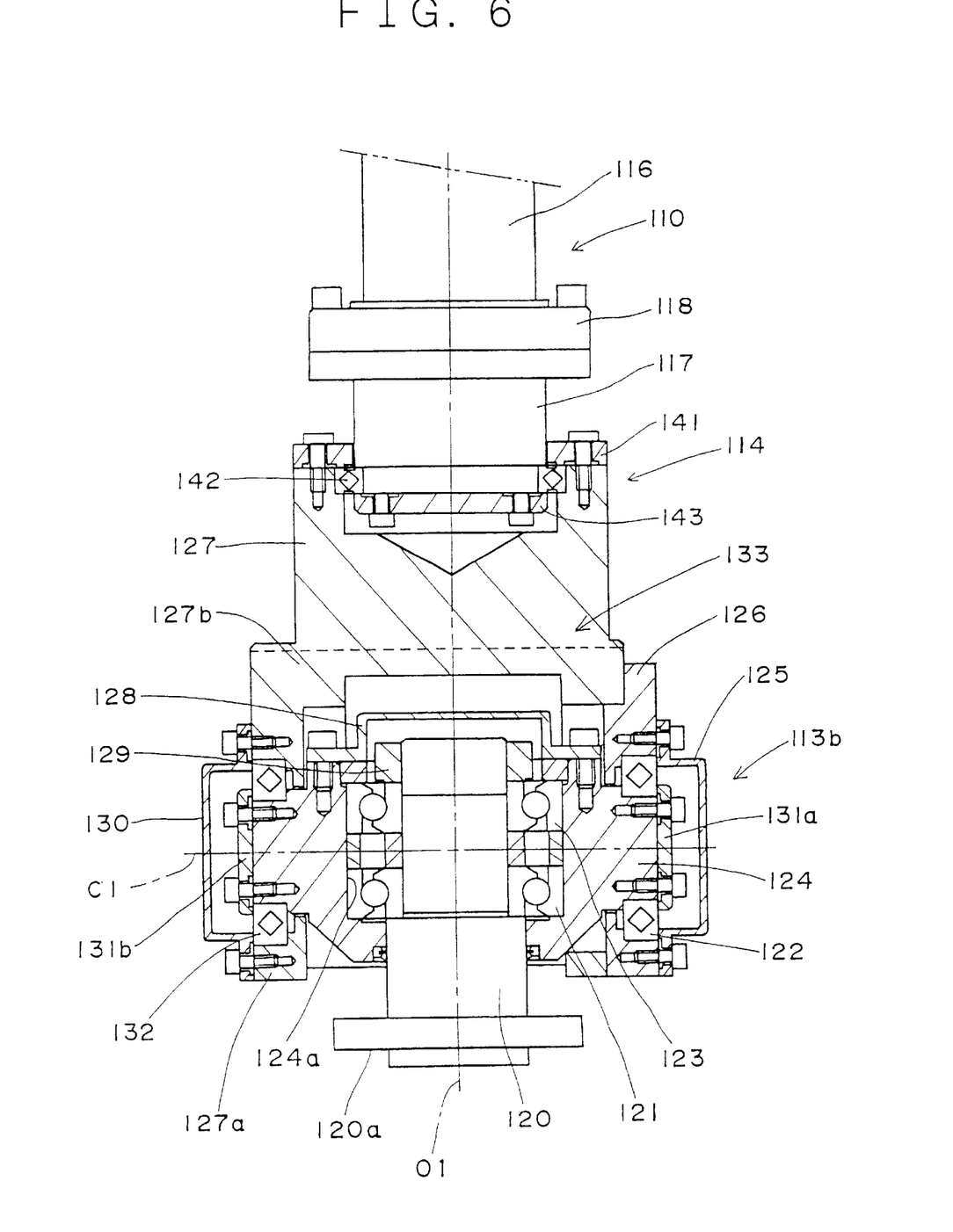
FIG. 6 is another embodiment of a second joint and third joint corresponding to FIGS. 4 and 5.

FIG. 6 shows another preferred embodiment of joints according to the invention which has two significant differences from the first embodiment of joints previously described. FIG. 6 is comparable to FIGS. 4 and 5 for the first embodiment. The reference numbers for each parts in FIG. 6 is shown by the numbers added a hundred to each of the reference numbers for the corresponding parts in FIGS. 4 and 5. Therefore, parts in the second embodiment without detailed description hereinafter are essentially the same as the corresponding parts in the first embodiment.

One difference between the first and the second embodiments is that a third joint 114 is arranged close by a second joint 113b. In addition, a frame 127 (i.e., a second rolling element 133) of the second joint 113b extends to form a frame of the third joint 114 in one body. The third joint 114 is fixed on the bottom end of the connecting rod 117 instead of the top end of the middle rod portion 16 in the first embodiment. This configuration enhances the rigidity of the second joint 113b and the third joint 114. Arranging two joints 113b and 114 close by the traveling plate 52 as a movable point decreases torsional stress acting the rod 110.

The other difference in the second embodiment in FIG. 6 is that decreasing rolling bearings to simplify the configuration of the second joint 113b. The second joint 113b includes two rolling bearings 121 and 123 for a first rolling element 124 instead of the four rolling bearings 21 and 23 in the first embodiment. Each of the rolling bearings 121 and 123 is designed to be larger than each of the rolling bearings 21 and 23 to enhance the rigidity of the second joint 113b.

An additional difference is that the configuration of the second joint 113b is symmetrized to simplify it. Rolling bearings 122 and 132 for a second rolling element 133 are symmetrically supported by first and second side plates 125 and 130, and first and second bearing supports 131a and 131b.

In the above mentioned embodiments, it will be appreciated that other types of rolling bearings are alternatively employed, for example, a cylindrical roller bearing, a barrel-shaped roller bearing and a taper roller bearing. In addition, the joints of the rod described above are not only provided for the above mentioned machine tool having the six-degree-of-freedom, but also for the machine tool having the three-degree-of-freedom.

What is claimed is:

1. A machine tool comprising a base, a traveling plate to which a tool is to be attached, plural rods, and plural drive mechanisms fixed to said base, wherein:

each of said drive mechanisms is provided with a slide table movable on said drive mechanism and with an actuator for moving said slide table;

one end of each of said rods is swingably connected to the corresponding slide tables through a first joint and the other end of each of said rods is swingably connected to said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth element is connected to said rod wherein said first joint and said second joint are respectively connected to said slide table and to said traveling plate through a shaft;

said shaft supports said first rolling element through said rolling bearing about a center axis of said shaft;

said first rolling element supports said second rolling element through said rolling bearing about a rolling axis perpendicular to the center axis of said shaft; and said second rolling element supports said rod perpendicular to the rolling axis.

2. A machine tool comprising:

a base;

a traveling plate to which a tool is to be attached;

six drive mechanisms fixed to said base;

six slide tables respectively supported by said drive mechanisms to be movable in the corresponding drive mechanisms;

six actuators for respectively moving said six slide tables;

six rods, one end of said rod is swingably connected to the corresponding slide table through a first joint and the other end of said rod is swingably connected with said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth rolling element is connected to said rod wherein said first joint and said second joint are respectively connected to said slide table and to said traveling plate through a shaft;

said shaft supports said first rolling element through said rolling bearing about a center axis of said shaft;

said first rolling element supports said second rolling element through said rolling bearing about a rolling axis perpendicular to the center axis of said shaft; and said second rolling element supports said rod perpendicular to the rolling axis.

3. A machine tool according to claim 1 or 2, wherein said first joint and said second joint are the same joint.

4. A machine tool comprising a base, a traveling plate to which a tool is to be attached, plural rods, and plural drive mechanisms fixed to said base, wherein:

each of said drive mechanisms is provided with a slide table movable on said drive mechanism and with an actuator for moving said slide table;

one end of each of said rods is swingably connected to the corresponding slide tables through a first joint and the other end of each of said rods is swingably connected to said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth element is connected to said rod, wherein said rod includes a third joint between said first joint and said second joint; and said third joint rotatably connects said first joint and said second joint through a rolling bearing about a center axis of said rod.

5. A machine tool comprising:

a base;

a traveling plate to which a tool is to be attached;

six drive mechanisms fixed to said base;

six slide tables respectively supported by said drive mechanisms to be movable in the corresponding drive mechanisms;

six actuators for respectively moving said six slide tables;

six rods, one end of said rod is swingably connected to the corresponding slide table through a first joint and the other end of said rod is swingably connected with said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth rolling element is connected to said rod, wherein said rod includes a third joint between said first joint and said second joint; and said third joint rotatably connects said first joint and said second joint through a rolling bearing about a center axis of said rod.

6. A machine tool according to claim 4 or 5, wherein said second rolling element of one of said first joint and said second joint supports the rolling bearing of said third joint to form one of said first and said second joints and said third joint in one body.

7. A machine tool according to claim 5, wherein one of said second rolling elements of said first joint and said fourth rolling element of said second joint, supports the rolling bearing of said third joint to form one of said first and second joints and said third joint in one body.

8. A machine tool according to claim 4 or 5, wherein said first joint and said second joint are the same joint.

9. A machine tool comprising a base, a traveling plate to which a tool is to be attached, plural rods, and plural drive mechanisms fixed to said base, wherein:

each of said drive mechanisms is provided with a slide table movable on said drive mechanism and with an actuator for moving said slide table;

one end of each of said rods is swingably connected to the corresponding slide tables through a first joint and the other end of each of said rods is swingably connected to said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth element is connected to said rod, wherein said rod consists of a first rod portion and a second rod portion connected to each other through a third joint;

said first rod portion is connected to said first joint;

said second rod portion is connected to said second joint; and said third joint rotatably connects said first rod portion and said second rod portion through a rolling bearing about a center axis of said rod.

10. A machine tool comprising:

a base;

a traveling plate to which a tool is to be attached;

six drive mechanisms fixed to said base;

six slide tables respectively supported by said drive mechanisms to be movable in the corresponding drive mechanisms;

six actuators for respectively moving said six slide tables;

six rods, one end of said rod is swingably connected to the corresponding slide table through a first joint and the other end of said rod is swingably connected with said traveling plate through a second joint;

said first joint includes a first rolling element rotatably supported to said slide table through a rolling bearing and a second rolling element rotatably supported to said first rolling element through a rolling bearing, and said second rolling element is connected to said rod; and said second joint includes a third rolling element rotatably supported to said traveling plate through a rolling bearing and a fourth rolling element rotatably supported to said third rolling element through a rolling bearing, and said fourth rolling element is connected to said rod, wherein said rod consists of a first rod portion and a second rod portion connected to each other through a third joint;

said first rod portion is connected to said first joint;

said second rod portion is connected to said second joint; and said third joint rotatably connects said first rod portion and said second rod portion through a rolling bearing about a center axis of said rod.

\* \* \* \* \*

UNITED STATES PATENT AND TRADEMARK OFFICE
CERTIFICATE OF CORRECTION

PATENT NO. : 5,941,128
DATED : August 24, 1999
INVENTOR(S) : Taizo TOYAMA, et al.

It is certified that error appears in the above-identified patent and that said Letters Patent is hereby corrected as shown below:

On the title page, item [73], the assignee's name should be:

--Toyoda Koki Kabushiki Kaisha--

Signed and Sealed this

Sixteenth Day of May, 2000

*Attest:*

Q. TODD DICKINSON

*Attesting Officer*     *Director of Patents and Trademarks*